Patented Dec. 22, 1925.

1,566,409

UNITED STATES PATENT OFFICE.

HARRY ALFRED LAVENE, OF NIAGARA FALLS, NEW YORK, ASSIGNOR TO ACHESON GRAPHITE COMPANY, OF NIAGARA FALLS, NEW YORK, A CORPORATION OF NEW JERSEY.

IMPREGNATED ELECTRODE FOR FURNACE WORK.

No Drawing.          Application filed February 5, 1923. Serial No. 617,176.

*To all whom it may concern:*

Be it known that I, HARRY ALFRED LAVENE, a citizen of the United States, residing at Niagara Falls, in the county of Niagara, State of New York, have invented certain new and useful Improvements in Impregnated Electrodes for Furnace Work; and I do hereby declare the following to be a full, clear, and exact description of the invention, such as will enable others skilled in the art to which it appertains to make and use the same.

This invention relates to carbon or graphite electrodes which may be used to conduct current into electric furnaces. More particularly, this invention relates to carbon or graphite electrodes which have been impregnated with substances which materially reduce the oxidation which ordinarily takes place during the normal use of such electrodes.

It is well known that carbon or graphite electrodes used in furnace work are comparatively short lived, due to the fact that they oxidize readily at the high temperatures which obtain within the furnace. The electrodes rapidly lose weight and they become tapered or pointed. This tapering is very objectionable not only from the standpoint of loss of carbon or graphite at points remote from the arc, but also from the standpoint of reduction in strength of the electrode. These tapered electrodes are weakened in proportion to the degree of taper and the liability of breakage is greatly increased.

One of the principal objects of this invention is to provide carbon or graphite electrodes treated in such a manner that they offer considerable resistance to oxidation. In general, the improved electrodes may be made by impregnating them with a solution or solutions of certain chemical compounds which have a tendency to fuse within the pores of the electrodes when they are subjected to high temperature. I have found that if carbon or graphite electrodes are given a preliminary impregnation with a solution or solutions of certain soluble salts the oxidation loss of the electrodes is greatly diminished. The salts used should be those which are not reduced by carbon or graphite or materially decomposed or volatilized at the temperatures ordinarily attained within the electrodes. It is believed that the salt, either in fused or decomposed state, partially coats and seals the pores of the electrodes, thus lessening the surface exposed and thereby protecting the electrodes from oxidation.

It has also been noticed, that the arc produced with an impregnated electrode is quieter and steadier, due to the presence of the salt vapors in the arc.

I have found that beneficial results may be obtained by impregnating the electrodes with a soluble salt such as calcium chloride, magnesium chloride or borax. As an illustration, graphite electrodes were impregnated with a concentrated solution of borax and then dried. When these electrodes were used in a commercial electric furnace the loss by oxidation was markedly less than the usual loss sustained by unimpregnated graphite electrodes when used under the same conditions.

I have also found that very desirable results may be obtained by giving the electrodes a double impregnation, the object being to produce a somewhat refractory material within the pores of the electrodes. In general, this object may be attained by giving the electrodes a preliminary impregnation with a soluble salt of such a character that it will react with a soluble silicate. The electrodes may then be impregnated with a soluble silicate, and the interaction of the first impregnating medium with the silicate produces a refractory compound. Chlorides of magnesium, calcium and aluminum, and sulphate of magnesium and aluminum, may be used as soluble salts suitable for the preliminary impregnation above referred to. The preliminary impregnation may be followed by an impregnation with an alkaline silicate, such as sodium silicate.

As an illustration of the double impregnation referred to, porous electrodes, such as carbon and graphite electrodes, have been impregnated with aluminum chloride, and subsequently impregnated with sodium silicate. At normal temperatures some aluminum silicate is formed, and at the temperatures which obtain within an electric furnace, this action becomes complete. It is also possible that the resulting refractory material may be partly composed of a double silicate of sodium and aluminum. This refractory material coats the pores of the electrodes and protects the electrodes from oxidation.

The impregnation may be carried out by any of the methods ordinarily used, either with or without the use of heat, vacuum and pressure. In fact, a beneficial result may be obtained by merely brushing the impregnating solution onto the electrodes which will readily absorb one or more coats of the solution.

A larger quantity of salt may be carried into the pores of the carbon or graphite electrode, than would ordinarily be the case, by use of a superheated saturated solution of the salt. This condition is brought about by charging the retort with a saturated solution of the salt, together with sufficient additional salt to produce a saturated solution at a much higher temperature than the boiling point of the solution at atmospheric pressure. The retort is then sealed, and the surrounding temperature raised. The steam generated in the retort builds up an internal presure in the retort, and the temperature of the solution being raised, it is capable of taking the additional salt in solution, thus raising the boiling point of the solution. In this manner, the degree of saturation of the solution is regulated by the operating pressure of the retort.

In regard to the double impregnation it is, of course, immaterial whether the electrodes are impregnated first with the soluble salt and then with the soluble silicate, or whether this order of impregnation is reversed.

Double impregnation may also be practiced by impregnating separately with two salts of different melting points which do not necessarily react with each other. One salt is so chosen that it melts at a low red heat, which is the point at which oxidation of carbon or graphite starts. As salts and compounds which have a low melting point are volatilized or decomposed at a relatively low temperature, this salt will not give full protection at the higher temperature. Accordingly, if the electrode be impregnated with a second salt, melting at a point close to the decomposition or volatilization point of the first salt, better protection will be obtained, as the decomposition or volatilization point of the second salt will be proportionately higher.

It is to be understood that this improved method of treating electrodes to increase their resistance to oxidation may be applied to any porous articles with like desirable results. The invention is not limited to the particular embodiments herein described, but is intended to include such modifications thereof as fall within the scope of the appended claims.

The term "porous electrode" as used in this application is intended to include carbon and graphite electrodes, both of which are porous, and therefore well adapted to be impregnated in the manner herein described.

I claim:

1. A porous electrode for furnace work, having a refractory compound in the pores thereof formed by the interaction of two soluble compounds.

2. A porous electrode for furnace work, having a refractory compound in the pores thereof formed by the interaction of a soluble salt and a soluble silicate.

3. A porous electrode for furnace work, having an insoluble silicate in the pores thereof formed by the interaction of a soluble salt and a soluble silicate.

4. A porous electrode for furnace work impregnated at least partially with two chemical compounds having different melting points.

5. A porous electrode for furnace work, having the pores thereof at least partially filled with an insoluble silicate formed by the interaction of a soluble chloride and a soluble silicate.

6. A porous electrode for furnace work, having the pores thereof at least partially filled with a silicate formed by the interaction of aluminum chloride and an alkaline silicate.

7. A porous electrode for furnace work, having the pores thereof at least partially filled with borax.

8. The process of increasing the resistance of porous articles to oxidation at high temperatures which consists in at least partially impregnating the article with a soluble salt, and subsequently impregnating the article with a soluble silicate.

9. The method of producing an insoluble refractory compound within the pores of an article which consists in impregnating the article with a soluble chloride, and subsequently impregnating the article with a soluble silicate.

10. The method of producing an insoluble refractory compound within the pores of an article which consists in subjecting the article to a preliminary impregnation with aluminum chloride, and subsequently impregnating the article with an alkaline silicate.

11. The process of increasing the resistance of porous articles to oxidation at high temperatures which consists in at least partially impregnating the articles with a superheated saturated solution of a soluble salt.

In testimony whereof I affix my signature.

HARRY ALFRED LAVENE.